(12) United States Patent
Davis, Jr. et al.

(10) Patent No.: US 6,482,340 B1
(45) Date of Patent: *Nov. 19, 2002

(54) SPRAYED-ON FOAM WIRE HARNESS

(75) Inventors: Joseph J. Davis, Jr., Ortonville, MI (US); David C. Pudduck, White Lake, MI (US)

(73) Assignee: Lear Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,550

(22) Filed: Mar. 30, 1999

(51) Int. Cl.[7] ............................................... B29C 44/12
(52) U.S. Cl. ................. 264/46.4; 264/272.11; 264/272.14; 264/272.15
(58) Field of Search ................. 264/272.11, 272.14, 264/272.15, 46.4, 263

(56) References Cited

U.S. PATENT DOCUMENTS

| | | | |
|---|---|---|---|
| 3,800,522 A | * | 4/1974 | Hughes et al. ................. 57/215 |
| 4,009,236 A | * | 2/1977 | Katsuta ....................... 264/46.7 |
| 4,083,902 A | * | 4/1978 | Clyde .......................... 264/26 |
| 4,289,924 A | | 9/1981 | Pearce, Jr. et al. |
| 4,555,284 A | * | 11/1985 | Quella et al. .................. 156/79 |
| 4,797,513 A | * | 1/1989 | Ono et al. ..................... 264/262 |
| 4,831,278 A | * | 5/1989 | Ueda et al. ................. 307/10.1 |
| 5,297,334 A | * | 3/1994 | Johnson ........................ 29/861 |
| 5,382,397 A | * | 1/1995 | Turner, Jr. .................. 264/46.5 |
| 5,442,518 A | * | 8/1995 | Beam .......................... 361/690 |
| 5,467,520 A | * | 11/1995 | Nunez et al. ............... 29/564.6 |
| 5,526,549 A | | 6/1996 | Mori et al. |
| 5,708,042 A | * | 1/1998 | Hasegawa ................... 264/46.7 |
| 5,811,732 A | * | 9/1998 | Beam ........................ 174/72 A |
| 6,126,228 A | * | 10/2000 | Davis, Jr. et al. ........ 296/146.7 |

FOREIGN PATENT DOCUMENTS

EP        0 235 924        9/1987

* cited by examiner

*Primary Examiner*—Allan R. Kuhns
(74) *Attorney, Agent, or Firm*—MacMillan, Sobanski & Todd, LLC

(57) ABSTRACT

A wire harness comprises a plurality of wires routed along a surface of a trim panel. The wires are encased and secured to the trim panel by a foam polymer. The wires are first routed on a surface of the trim panel. A foam gun including a wire guide and a nozzle is moved along the length of the wires, simultaneously gathering and aligning the wires and spraying a foamable liquid onto the wires. The liquid polymer foams and cures, thereby securing the wires to the trim panel and encasing the wires.

11 Claims, 2 Drawing Sheets

SPRAYED-ON FOAM WIRE HARNESS

BACKGROUND OF THE INVENTION

The present invention relates generally to wire harnesses and more particularly to a method and means for securing a wire harness to an interior trim panel of a vehicle.

Current vehicles include many wire harnesses secured to interior trim panels, such as door panels and headliners, for operating interior lights, such as a dome light or lights in a vanity mirror in a visor. Further, interior door trim panels include wire harnesses routed to user activated switches, such as for power windows, power locks, mirrors, etc.

Each wire harness comprises a plurality of wires which are bundled to form a trunk and a plurality of branches extending from the trunk. Typically, each of the branches includes an electrical connector at an outer end. During assembly of the wire harness, the wire bundles are held together in an assembly jig, which includes a plurality of wire supports supporting the wires along each of the main trunk and each of the branches. Each wire is placed onto the assembly jig onto the appropriate wire supports, i.e. from a first branch to the wire harness, along the main trunk and through a second branch, typically at an opposite end of the wire harness. Electrical connectors are then connected to the outer ends of the wires at the branches. The wires are then wrapped with tape along the entire length of the main trunk and each of the branches.

A wire harness is placed on an interior trim panel prior to installation of the trim panel into the vehicle. The main trunk and each of the branches are positioned in appropriate locations on the trim panel. Then, the wire harness is secured to the trim panel with an adhesive, such as a hot glue, which secures the main trunk and branches of the wire harness to the trim panel. This method is time consuming and the adhesive is expensive. Further, it is difficult to secure the wire harness to the trim panel consistently and reliably. Further, manufacture of the wire harness as described above is time consuming and difficult. Wrapping the tape along the entire length of the main trunk and each of the branches is a labor intensive process.

In co-pending application U.S. Ser. No. 08/927,748 filed Sep. 11, 1997, entitled "Wire Harness Foamed to Trim Panel," the assignee of which is the assignee of the present invention, a polymer foam sheath encases a plurality of wires and secures the wires to a surface of an interior trim panel. The wires are first routed on the surface of the trim panel. A mold generally comprising a half cylinder forming a trough is placed upon the surface of the trim panel, enclosing the wires within the trough between the mold and the surface of the trim panel. The mold includes troughs matching the main trunk in each of the branches of the wire harness. The foam is then introduced into the trough, thereby encasing the wires and adhering to the trim panel. Although the wire harness formed in this manner performs well, the mold to form the wire harness is cumbersome and large.

SUMMARY OF THE INVENTION

The present invention provides a wire harness foamed to an interior trim panel, and a method and device for making the wire harness. The inventive wire harness comprises a plurality of wires routed generally along a surface of a trim panel. The plurality of wires is encased by a polymer and secured to the surface of the trim panel by the polymer.

A foam gun for forming the wire harness generally comprises a wire guide for gathering and aligning the plurality of wires generally adjacent one another and the surface of the interior trim panel. The foam gun further includes a nozzle secured to the guide for delivering the foam. The foam gun further includes a handle mounted to the guide and the nozzle.

According to a method of the present invention, the plurality of wires are first routed on the surface of the trim panel. The foam gun is then placed at a first end of the wires and slid along the surface of the trim panel toward an opposite end of the wires. While the foam gun is moved along the plurality of wires, the foam gun sprays a two-part polymer foam onto the wires. The foam foams and cures, thereby securing the plurality of wires to the trim panel and encasing the plurality of wires. As the foam gun is moved along the plurality of wires, the plurality of wires are gathered together and aligned to be generally adjacent one another and the surface of the trim panel by the wire guide, just before the nozzle sprays the foam onto the wires.

BRIEF DESCRIPTION OF THE DRAWINGS

The above, as well as other advantages of the present invention, will become readily apparent to those skilled in the art from the following detailed description of a preferred embodiment when considered in the light of the accompanying drawing in which.

DETAILED DESCRIPTION OF A PREFERRED EMBODIMENT

Figure 1:
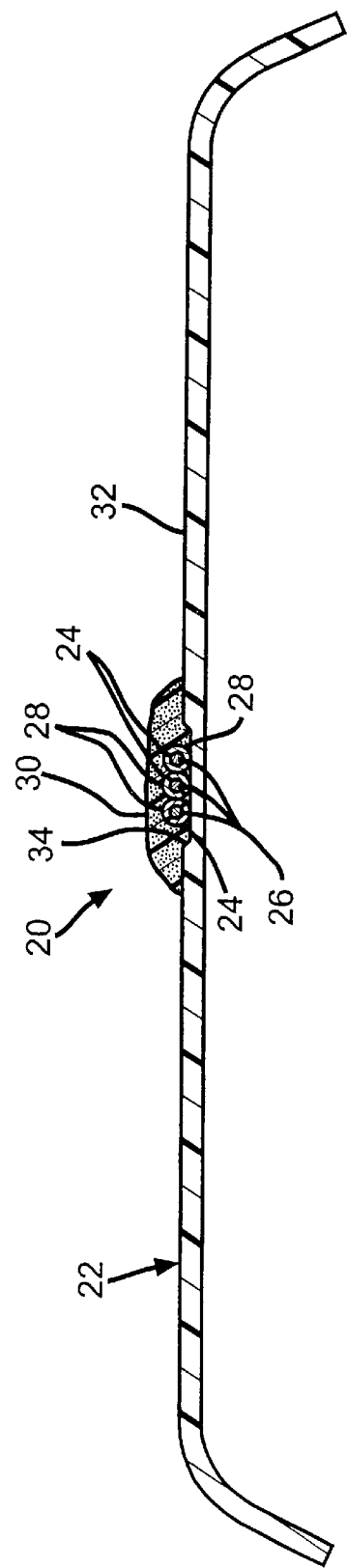
FIG. 1 is a sectional view of the wire harness of the present invention formed on a trim panel.

A wire harness 20 of the present invention is shown in FIG. 1 secured to a trim panel 22, such as a headliner, door panel, instrument panel, etc. The wire harness 20 comprises a plurality of wires 24, each comprising a conductor 26 encased by an insulator 28. The plurality of wires 24 are encased by a polymer foam 30 which also secures the wires 24 to a surface 32 of the trim panel 22. Preferably, the surface 32 of the trim panel 22 also includes an elongated recess 34 into which the wires 24 and/or foam 30 may be disposed, or partially disposed. The foam is preferably a two-part open cell foam, such as polyurethane, and most preferably Elastoflex©, available from BASF.

Figure 2:
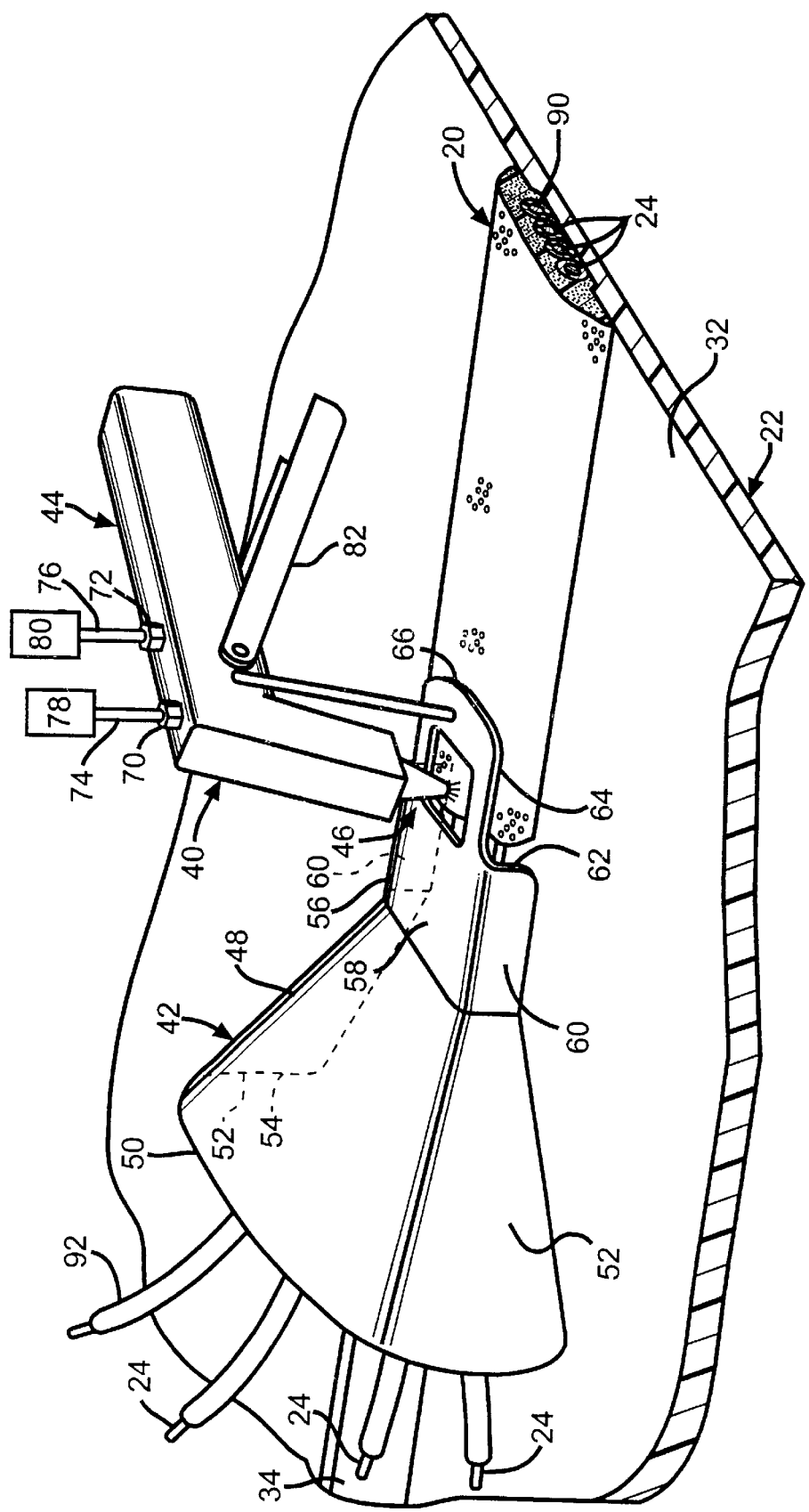
FIG. 2 illustrates a foam gun of the present invention forming the wire harness of FIG. 1 according to an inventive method.

A foam gun 40 and method for forming the wire harness 20 is shown in FIG. 2. The foam gun 40 generally comprises a wire guide 42, handle 44, and nozzle 46. The guide 42 comprises a forward portion 48 including an upper wall 50 and side walls 52 converging from a forward large opening 54 to a mid portion 56 of the guide 42. The mid portion comprises an upper wall 58 and parallel sidewalls 60 which lead to a rear opening 62 which is generally smaller than the forward large opening 54 of the forward portion 48. A rear portion 64 generally comprises an extension 66 of the upper wall 58 of the mid portion 56. The handle 44 and nozzle 46 are secured to the extension 66. The handle 44 includes a pair of inlets 70, 72 to which supply lines 74, 76 are secured. Supply lines 74, 76 supply the two parts of the polymer foam, preferably a resin 78 and a blowing agent 80. Both of the inlets 70, 72 lead to the nozzle 46. Flow through the inlets 70, 72 is selectively, manually controlled by a trigger 82 mounted on the handle 44.

To manufacture the wire harness 20 according to the present invention, the plurality of wires 24 are first laid adjacent the trim panel 22. The foam gun 40 is then laid on the surface 32 of the trim panel 22, preferably in the recess 34, such that the wires 24 are disposed within the wire guide 42. The foam gun 40 is then moved from a first end 90 of the wires 24 to an opposite second end 92 of the wires 24. While the foam gun 40 is moved along the trim panel 22, the trigger 82 is activated, thereby permitting the two part polymer foam to flow through the nozzle 46 onto the wires 24 and trim panel 22. As the foam gun 40 is moved from the first end 90 to the second end 92, the wires 24 are gathered and generally aligned with each other and to the surface 32 of the trim panel 22, preferably in the recess 34. As the two materials 78, 80 are sprayed by the nozzle 46, the polymer foams and cures around the wires 24 and secures the wires 24 to the surface 32 of the trim panel 22.

Utilizing the foam gun 40 and method of the present invention, the wires 24 can quickly and easily be secured to the trim panel 22 and encased by the foam 30. The oparation can be performed by a single operator, without the use of large molds.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for securing wires to a panel including the steps of:
   a) providing a wire guide having a forward opening and a rear opening, wherein the rear opening is smaller than the forward opening;
   b) placing a wire adjacent a first surface of a panel and through the forward opening to the rear opening of the wire guide;
   c) moving the wire guide along a length of the wire; and
   d) encasing the wire with a polymer adjacent the rear opening of the wire guide as the wire guide is moved along the length of the wire so that the wire is secured to the panel.

2. The method as specified in claim 1 wherein the polymer is sprayed onto the wire.

3. The method as specified in claim 2 wherein the polymer is sprayed from a foam gun.

4. The method as specified in claim 3 wherein supply lines for a resin and a blowing agent are attached to the foam gun.

5. The method as specified in claim 1 wherein the wire is encased by the polymer continuously from a first end to a second end.

6. The method as specified in claim 1 wherein the wire is placed in a recess formed in the panel.

7. The method as specified in claim 1 wherein the wire guide includes an extension projecting adjacent the rear opening of the wire guide.

8. The method as specified in claim 7 including a foam gun secured to the extension, wherein the polymer is sprayed from the foam gun.

9. The method as specified in claim 8 wherein supply lines for a resin and a blowing agent are attached to the foam gun.

10. The method as specified in claim 9 wherein the wire is encased by the polymer continuously from a first end to a second end.

11. A method for securing a plurality of wires to a panel comprising the steps of:
   a) providing a panel defining a surface along which a wire harness is to be located;
   b) providing a plurality of wires having first and second ends;
   c) providing a wire guide for encasing the wires within a polymer, wherein the guide has a forward portion for gathering the plurality of wires, and the wire guide includes a forward opening and a rear opening, wherein the rear opening is smaller than the forward opening; and
   d) moving the wire guide along the surface of the panel to encase the wires from the first ends to the second ends with the polymer to secure the wires to the surface of the panel, wherein the movement of the guide gathers the plurality of wires to generally align the wires with each other as the plurality of wires are encased by the polymer.

* * * * *